US009520753B2

(12) United States Patent
Rahman et al.

(10) Patent No.: US 9,520,753 B2
(45) Date of Patent: *Dec. 13, 2016

(54) STATOR ASSEMBLY WITH WINDING SETS HAVING HAIRPINS FROM MULTIPLE HAIRPIN LAYERS

(71) Applicant: GM GLOBAL TECHNOLOGY OPERATIONS LLC, Detroit, MI (US)

(72) Inventors: Khwaja M. Rahman, Troy, MI (US); Edward L. Kaiser, Orion, MI (US); Sinisa Jurkovic, Sterling Heights, MI (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 502 days.

This patent is subject to a terminal disclaimer.

(21) Appl. No.: 13/949,294

(22) Filed: Jul. 24, 2013

(65) Prior Publication Data

US 2015/0028713 A1  Jan. 29, 2015

(51) Int. Cl.
*H02K 3/28* (2006.01)
*H02K 3/04* (2006.01)

(52) U.S. Cl.
CPC .. *H02K 3/28* (2013.01); *H02K 3/04* (2013.01)

(58) Field of Classification Search
CPC .................................... H02K 3/04; H02K 3/28
USPC ........................... 310/198, 179, 189, 201, 71
See application file for complete search history.

(56) References Cited

U.S. PATENT DOCUMENTS

| | | | |
|---|---|---|---|
| 6,201,332 B1* | 3/2001 | Umeda | H02K 3/28 310/179 |
| 6,894,417 B2 | 5/2005 | Cai et al. | |
| 7,622,843 B2 | 11/2009 | Cai | |
| 2002/0017825 A1 | 2/2002 | Oohashi et al. | |
| 2003/0214196 A1* | 11/2003 | Cai | H02K 3/28 310/208 |
| 2006/0033394 A1* | 2/2006 | Ogawa | H02K 3/28 310/179 |
| 2009/0140596 A1 | 6/2009 | Kaiser et al. | |
| 2012/0146447 A1* | 6/2012 | Seguchi | H02K 3/28 310/198 |

FOREIGN PATENT DOCUMENTS

| | | |
|---|---|---|
| CN | 1531167 A | 9/2004 |
| CN | 103339834 A | 10/2013 |

* cited by examiner

*Primary Examiner* — Michael Andrews
(74) *Attorney, Agent, or Firm* — Quinn Law Group, PLLC

(57) ABSTRACT

A stator assembly includes a plurality of stator slots defining multiple slot layers. The assembly includes a plurality of hairpins each having a respective first leg positioned in one of the multiple slot layers and a respective second leg positioned in another of the multiple slot layers. Each hairpin is configured to allow a current to flow from the respective first leg to the respective second leg. The plurality of hairpins is divided into multiple hairpin layers. The hairpins form multiple winding sets, such as first, second, third and fourth winding sets. Each of the winding sets at least partially includes the hairpins from at least two of the multiple hairpin layers. The multiple slot layers may include six slot layers. The multiple hairpin layers may include six hairpin layers. Thus, at least one of the hairpin layers may be "shared" by two winding sets.

11 Claims, 4 Drawing Sheets

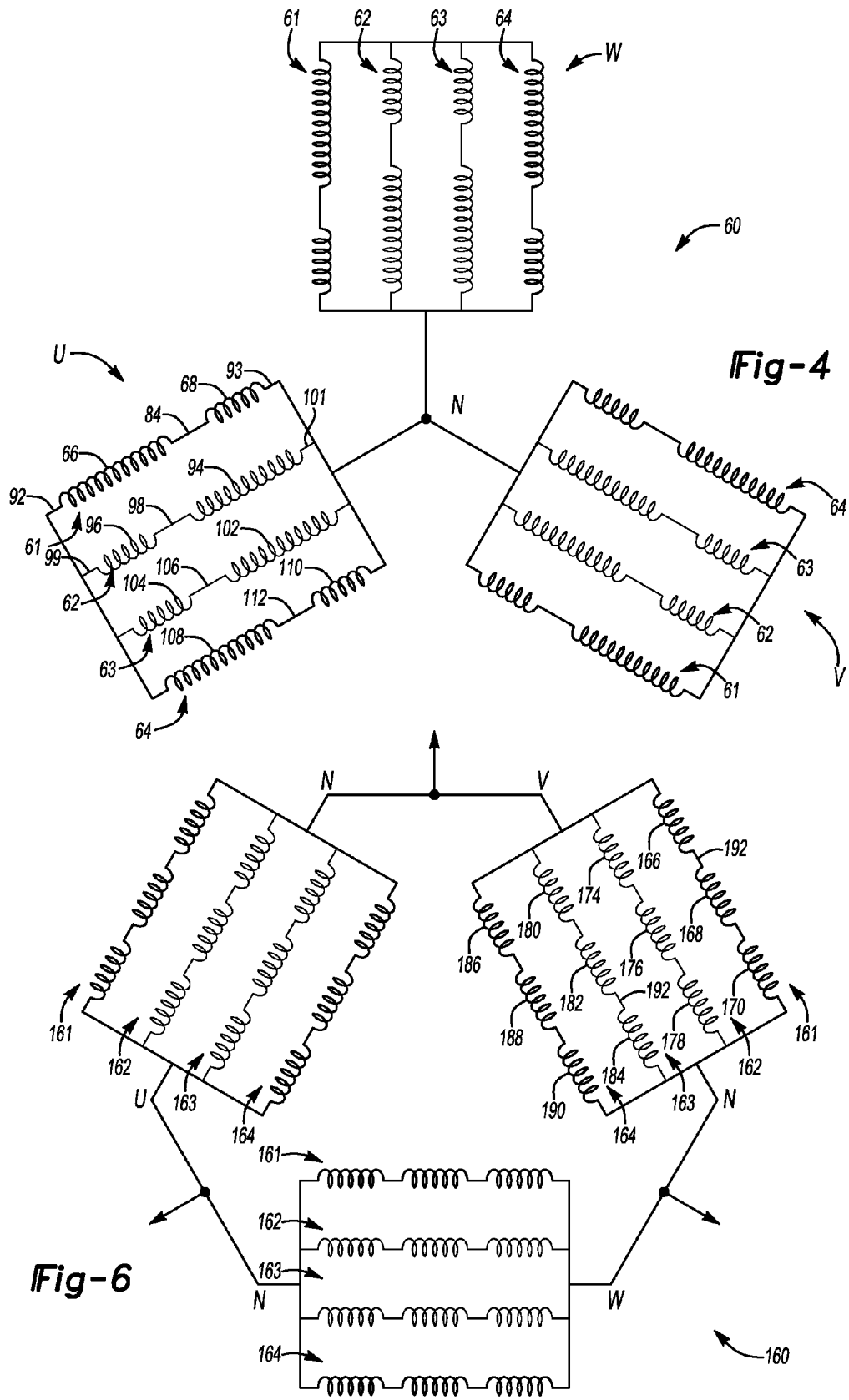

STATOR ASSEMBLY WITH WINDING SETS HAVING HAIRPINS FROM MULTIPLE HAIRPIN LAYERS

TECHNICAL FIELD

The disclosure relates generally to a stator assembly in an electric machine, and more particularly, to the winding configuration in a bar-wound stator assembly.

BACKGROUND

An electric machine includes a rotor assembly that is rotatable relative to a stator assembly. The stator assembly generally includes a plurality of stator windings inserted into slots in the stator assembly. A bar wound stator assembly is sometimes employed in electric machines to improve machine thermal and overall performance. The number of turns or windings in a bar-wound stator assembly may generally only be changed in discrete steps corresponding to specific configurations.

SUMMARY

A stator assembly includes a plurality of stator slots defining multiple slot layers. The assembly includes a plurality of conductors or hairpins each having a respective first leg positioned in one of the multiple slot layers and a respective second leg positioned in another of the multiple slot layers. For bar wound construction, the conductor is typically referred to as a "hairpin" by those skilled in the art and will be referred to as such in this description. The plurality of hairpins is divided into multiple hairpin layers. Each of the hairpins (the term "hairpins" is intended to refer to "the plurality of hairpins") is configured to allow a current flow from the respective first leg to the respective second leg.

The hairpins form multiple winding sets, such as first, second, third and fourth winding sets. Each of the winding sets at least partially includes the hairpins from at least two of the multiple hairpin layers. The multiple slot layers may include first, second, third, fourth, fifth and sixth slot layers. The multiple hairpin layers may include first, second, third, fourth, fifth and sixth hairpin layers. Thus, at least one of the hairpin layers may be "shared" by two winding sets. This stator winding arrangement improves the flexibility of the bar-wound stator assembly by allowing for additional turn counts or additional configurations.

In a first embodiment, the first winding set includes a combination of hairpins from the first and third hairpin layers. The second winding set includes a combination of hairpins from the second and fourth hairpin layers. The third winding set includes a combination of hairpins from the fifth and third hairpin layers. The fourth winding set includes a combination of hairpins from the sixth and fourth hairpin layers. Thus, in the first embodiment, the third hairpin layer may be shared by the first and third winding sets and the fourth hairpin layer may be shared by the second and fourth winding sets.

In one example, the first winding set may include 12 hairpins from the first hairpin layer connected in series with 6 hairpins from the third hairpin layer. The second winding set may include 12 hairpins from the second hairpin layer connected in series with 6 hairpins from the fourth hairpin layer. The third winding set may include 12 hairpins from the fifth hairpin layer connected in series with 6 hairpins from the third hairpin layer. The fourth winding set may include 12 hairpins from the sixth hairpin layer connected in series with 6 hairpins from the fourth hairpin layer.

The first hairpin layer may be defined by hairpins with the respective first leg in the first slot layer and the respective second leg in the second slot layer. The second hairpin layer may be defined by the hairpins with the respective first leg in the second slot layer and the respective second leg in the first slot layer. The third hairpin layer may be defined by the hairpins with the respective first leg in the third slot layer and the respective second leg in the fourth slot layer. The fourth hairpin layer may be defined by the hairpins with the respective first leg in the fourth slot layer and the respective second leg in the third slot layer. The fifth hairpin layer may be defined by the hairpins with the respective first leg in the fifth slot layer and the respective second leg in the sixth slot layer. The sixth hairpin layer may be defined by the hairpins with the respective first leg in the sixth slot layer and the respective second leg in the fifth slot layer.

Each of the hairpins may be a short-pitched coil or a full-pitched coil. The short-pitched and full-pitched coils are configured to extend over a first and second number of the plurality of stator slots, respectively, such that the first number is less than the second number. In one example, the first and second numbers are 8 and 9. In the first embodiment, the third and fourth hairpin layers may include more of the short-pitched coils than any of the first, second, fifth and sixth hairpin layers. For example, the third and fourth hairpin layers may each include at least four short-pitched coils while the first, second, fifth and sixth hairpin layers may each include at least two short pitched coils.

Each of the first, second, third and fourth winding sets may define an identical number of multiple phases. In one embodiment, the multiple phases is exactly three phases; the plurality of stator slots includes exactly 72 slots; and the stator defines 8 poles.

In a second embodiment, the first and second winding sets each include a combination of the plurality of hairpins from the first, third and fifth hairpin layers. The third and fourth winding sets each include a combination of the plurality of hairpins from the second, fourth and sixth hairpin layers. In the second embodiment, the first and second winding sets may each include six of the plurality of hairpins from each of the first, third and fifth hairpin layers. The third and fourth winding sets may each include six of the plurality of hairpins from each of the second, fourth and sixth hairpin layers.

In the second embodiment, the first, second, third, fourth, fifth and sixth hairpin layers each may include the same number of short-pitched coils. For example, each of the first through sixth hairpin layers may include at least four short-pitched coils. An electric machine may include the stator assembly described above.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic diagram of electrical connections between the winding sets in the stator assembly of FIG. 1, in accordance with a first embodiment;

FIG. 6 is a schematic diagram of electrical connections between the winding sets in the stator assembly of FIG. 1, in accordance with a second embodiment.

DETAILED DESCRIPTION

Figure 1:
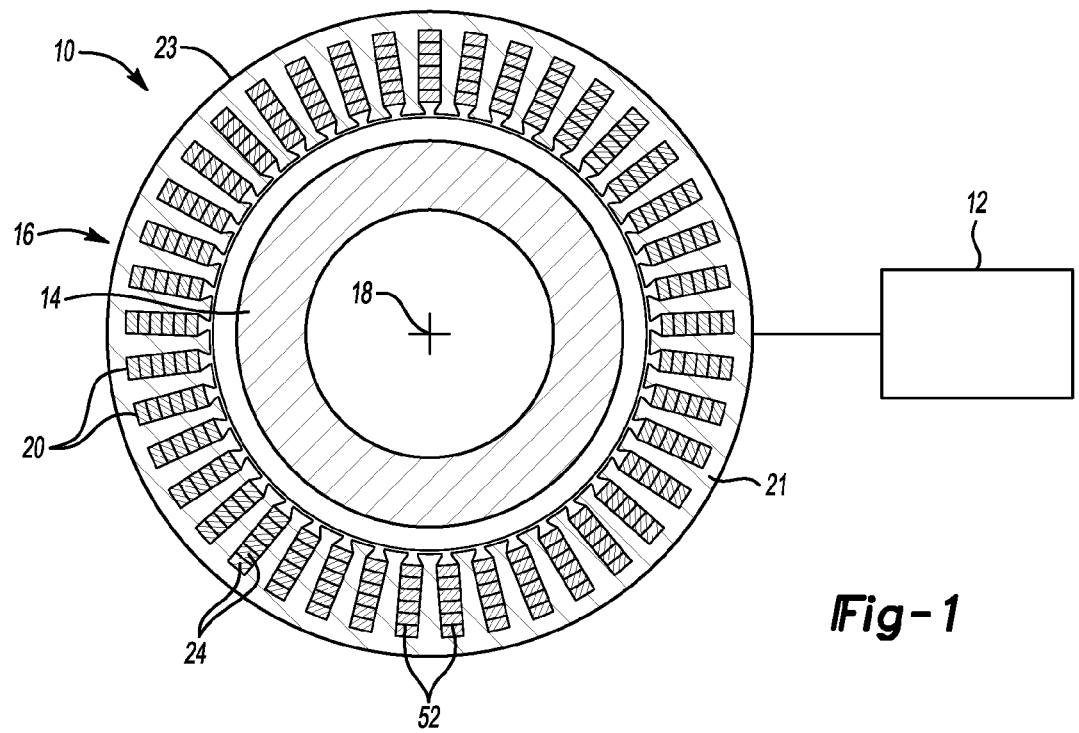
FIG. 1 is a schematic fragmentary sectional view of an electric machine with a stator assembly having multiple winding sets.

Referring to the Figures, wherein like reference numbers refer to the same or similar components throughout the several views, FIG. 1 is a schematic fragmentary sectional view of an electric motor/generator or electric fraction machine, referred to herein as electric machine 10. The electric machine 10 may be employed in a vehicle 12. The vehicle 12 may be any passenger or commercial automobile such as a hybrid electric vehicle including a plug-in hybrid electric vehicle, an extended range electric vehicle, or other vehicles. The electric machine 10 may include any device configured to generate an electric machine torque by, for example, converting electrical energy into rotational motion. For instance, the electric machine 10 may be configured to receive electrical energy from a power source, such as a battery array (not shown). The power source may be configured to store and output electrical energy. The vehicle 12 may include an inverter (not shown) for converting the DC voltage from the battery array into alternating current (AC) voltage. The electric machine 10 may be configured to use the AC voltage from the inverter to generate rotational motion. The electric machine 10 may be further configured to generate electrical energy when provided with mechanical energy, such as the mechanical energy (torque) of an engine.

Referring to FIG. 1, the electric machine 10 includes a rotor assembly 14 and a stator assembly 16. The rotor assembly 14 is rotatable relative to and within the stator assembly 16 about a longitudinal axis 18 (extending out of the page in FIG. 1). The rotor assembly 14 may be annularly-shaped and positioned around a shaft (not shown). The rotor assembly 14 may be of any type known to those skilled in the art, including but not limited to, an interior permanent magnet, a surface permanent magnet, an induction, synchronous, reluctance or a separately-excited/wound-field rotor. The specific configuration of the rotor assembly 14 is not shown in FIG. 1.

Referring to FIG. 1, the stator assembly 16 includes a plurality of stator slots 20 extending away from a stator core 21. The stator slots 20 may extend lengthwise along the longitudinal axis 18 and may be evenly spaced from each other radially about the longitudinal axis 18. The stator assembly 16 may include any number of slots or poles suitable to the application at hand. In one example, the number of stator slots 20 is exactly 72 (FIG. 1 is intended as a schematic illustration only) and the stator assembly 16 defines 8 poles.

Figure 2:
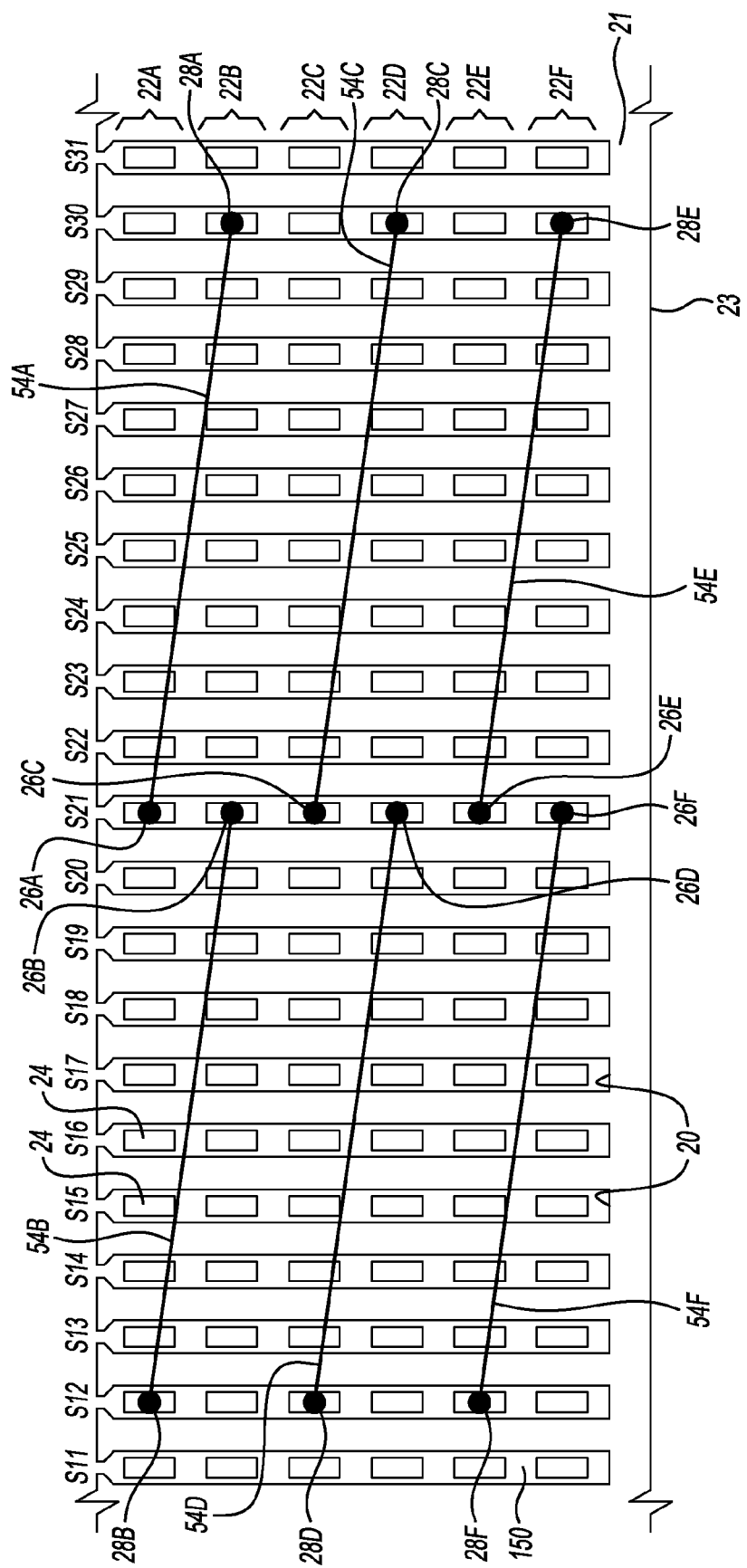
FIG. 2 is a schematic fragmentary sectional view of the stator assembly of FIG. 1.

FIG. 2 is a schematic fragmentary sectional view of the stator assembly 16. In the embodiment shown, the stator assembly 16 includes 72 slots. FIG. 2 shows stator slot numbers S11 through S31. The plurality of stator slots 20 may define multiple slot layers, such as first, second, third, fourth, fifth and sixth slot layers 22A, B, C, D, E and F, shown in FIG. 2. The first slot layer 22A is farthest from the outer diameter 23 of the stator core 21 and the sixth slot layer 22F is closest to the outer diameter 23 of the stator core 21. However, it should be appreciated that each stator slot 20 may include a different number of layers, including but not limited to, four layers or eight layers. Referring to FIGS. 1-2, the stator slots 20 may be partially open slots or closed slots.

Figure 3:
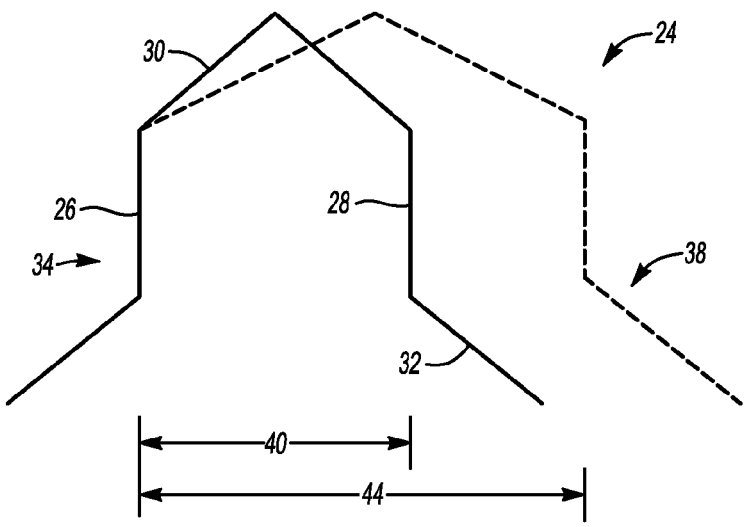
FIG. 3 is a schematic perspective view of hairpins that may be employed in the stator assembly of FIG. 1.

Referring to FIGS. 1-2, the stator assembly 16 includes a plurality of conductors or hairpins 24. For bar wound construction, the conductor is typically referred to as a "hairpin" by those skilled in the art and will be referred to as such in this description. FIG. 3 is a schematic diagram of two types of conductors or hairpins 24 that may be employed in the stator assembly 16. It is understood that the hairpins 24 shown in FIG. 3 are only schematic, and are not meant to represent the scale or specific shape of the hairpins 24 as is known to those skilled in the art. Referring to FIGS. 1-2, the hairpins 24 may include a substantially rectangular cross-section. However, any other cross-sectional shape may be employed.

Referring to FIG. 3, the hairpins 24 are segmented and include a respective first leg 26, a respective second leg 28 and a respective bent end portion 30 between the respective first and second legs 26, 28. The hairpins 24 are configured to allow a current to flow from the respective first leg 26 to the respective second leg 28. Referring to FIG. 3, after being inserted into the stator slot 20, the ends 32 of the hairpins 24 are bent outward to enable connections between respective hairpins 24 by welding.

Referring to FIG. 3, two types of hairpins 24 are shown: a short-pitched coil 34 and a full-pitched coil 38. Referring to FIG. 3, the short-pitched coil 34 has a first span 40 and the full-pitched coil 38 has a second span 44. The span of the hairpin 24 may be defined as the angular distance between stator slots 20 through which a single hairpin 24 is positioned. As shown in FIG. 3, the second span 44 is greater than the first span 40. Stated differently, each hairpin 24 spans a pre-determined number of stator slots 20. The short-pitched and full-pitched coils 34, 38 are configured to extend over a first and second number of the plurality of stator slots 20, respectively, the first number being less than the second number. In one example, the first and second numbers are 8 and 9.

Referring to FIGS. 1-2, a stator slot liner 52 may be inserted within the stator slots 20 to electrically isolate the hairpins 24 from the stator core 21 and from one another. The hairpins 24 must be electrically isolated from the stator core to prevent phase to ground shorts and electrically isolated from one another to prevent phase to phase shorts from occurring. The hairpins 24 may be coated with enamel, with the slot liner 52 providing extra protection. In the embodiment shown, the stator slots 20 are partially open slots and the hairpins 24 and the stator slot liner 52 may be axially or radially inserted. However, the stator slots 20 may also be closed slots and the hairpins 24 and the slot liner 52 may be radially inserted.

Referring now to FIG. 2, the hairpins 24 each have their respective first leg 26 inserted into one of the first, second, third, fourth, fifth and sixth slot layers 22A-F and their respective second leg 28 inserted into another of the first, second, third, fourth, fifth and sixth slot layers 22A-F. The hairpins 24 may be divided into multiple hairpin layers, such as first, second, third, fourth, fifth and sixth hairpin layers 54A-F, shown in FIG. 2 (and FIGS. 4-5). The lines in FIG. 2 representing hairpin layers 54A-F are only schematic, and are not meant to represent the scale or specific shape of the hairpins 24 as is known to those skilled in the art.

Referring to FIG. 2, the first hairpin layer 54A (forward winding from first to second slot layer 22A to 22B) is formed by the plurality of hairpins 24 having their first leg 26A in the first slot layer 22A (e.g. in slot S21) and their second leg 28A in the second slot layer 22B (e.g. in slot S30). In other words, the first hairpin layer 54A is the forward winding from the first to second slot layers 22A to 22B. Referring to FIG. 2, the second hairpin layer 54B is defined by the plurality of hairpins 24 having their first leg 26B in the second slot layer 22B (e.g. in slot S21) and their second leg 28B in the first slot layer 22A (e.g. in slot S12). In other words, the second hairpin layer 54B is the reverse winding from the second to first slot layers 22B to 22A.

Referring to FIG. 2, the third hairpin layer 54C is defined by the plurality of hairpins 24 with their first leg 26C in the third slot layer 22C (e.g. in slot S21) and their second leg 28C in the fourth slot layer 22D (e.g. in slot S30). In other words, the third hairpin layer 54C is the forward winding from the third to fourth slot layers 22C to 22D. Referring to FIG. 2, the fourth hairpin layer 54D is defined by the plurality of hairpins 24 with their first leg 26D in the fourth slot layer 22D (e.g. in slot S21) and their second leg 28D in the third slot layer 22C (e.g. in slot S12). In other words, the fourth hairpin layer 54D is the reverse winding from the fourth to third slot layers 22D to 22C.

Referring to FIG. 2, the fifth hairpin layer 54E is defined by the plurality of hairpins 24 with their first leg 26E in the fifth slot layer 22E (e.g. in slot S21) and their second leg 28E in the sixth slot layer 22F (e.g. in slot S30). In other words, the fifth hairpin layer 54E is the forward winding from the fifth to sixth slot layers 22E to 22F. Referring to FIG. 2, the sixth hairpin layer 54F is defined by the plurality of hairpins 24 with their first leg 26F in the sixth slot layer 22F (e.g. in slot S21) and their second leg 28F in the fifth slot layer 22E (e.g. in slot S12). In other words, the sixth hairpin layer 54F is the reverse winding from the sixth to fifth slot layers 22F to 22E.

FIG. 4 is a schematic diagram of a first embodiment of the electrical connections 60 of the stator assembly 16. The hairpins 24 form multiple winding sets, such as first, second, third, and fourth winding sets 61, 62, 63, 64 (shown in FIG. 4) within the stator slots 20 (shown in FIGS. 1-2). However, any number of winding sets may be configured according to the particular application at hand. The first through fourth winding sets 61-64 may be connected in series or in parallel. The first through fourth winding sets 61-64 may define an identical number of multiple phases. In one embodiment, each winding set defines a "U" phase, a "V" phase and a "W" phase. In another embodiment, each winding set defines five phases, i.e., the winding set defines a "U" phase, a "V" phase, an "X" phase, a "Y" phase and a "Z" phase. However, the electric machine 10 is not limited to a three or five phase machine, and the number of phases may differ from the phases described herein.

As shown in FIG. 4, the first, second, third and fourth winding sets 61-64 may be parallel to one another. Each of the first, second, third and fourth winding sets 61-64 include a different plurality of hairpins 24 connected in series.

Figure 5:
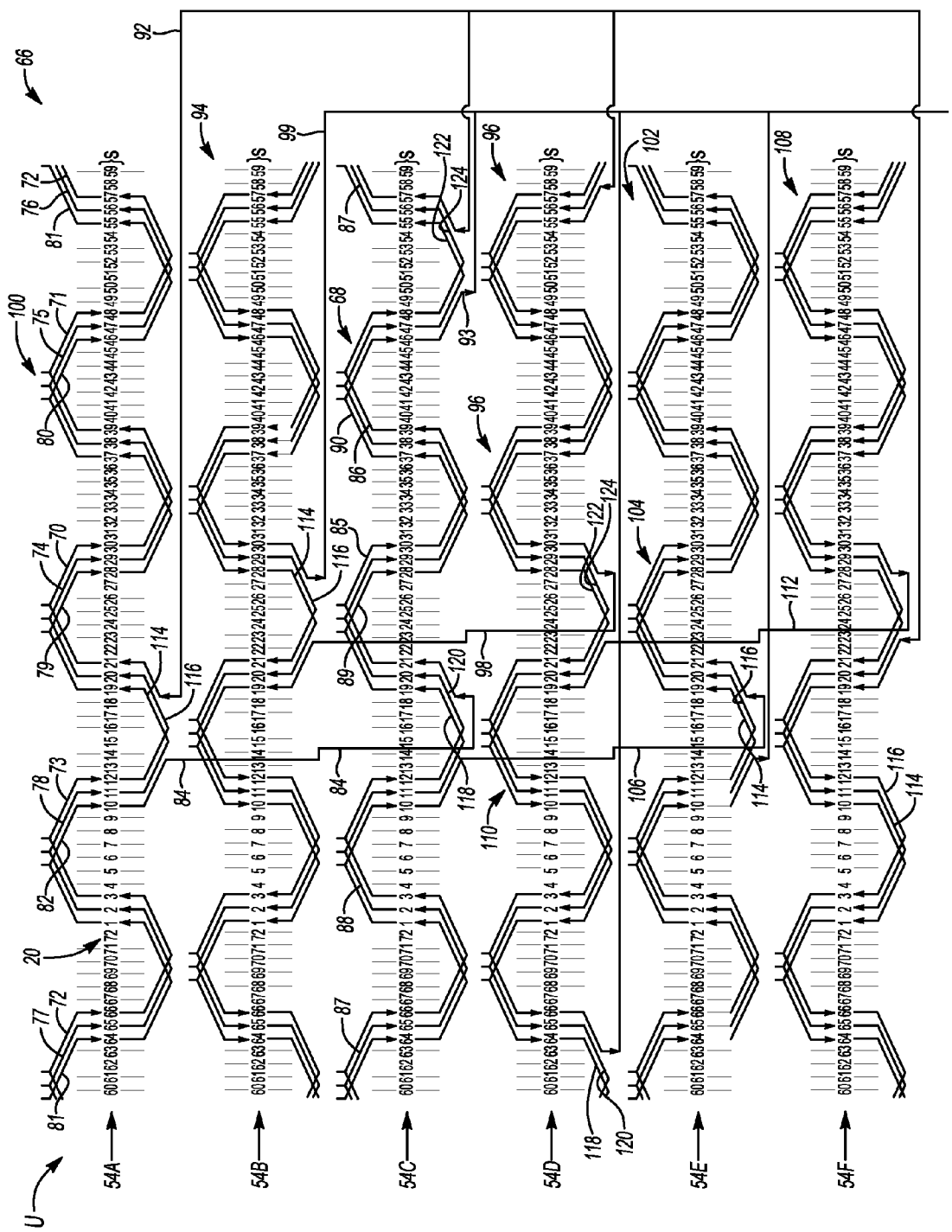
FIG. 5 is a schematic wiring diagram for the stator assembly of FIG. 4.

FIG. 5 is a schematic diagram of a winding layout 100 for the first through sixth hairpin layers 54A-F, corresponding to the connections shown in FIG. 4. FIG. 5 represents a stator assembly 16 with 72 slots. The slot numbers are bracketed on the right by the letter "S" (such that numbers 1 through 72 refer to slots S1 through S72). FIG. 5 shows all the stator slots (S1-72) with the right side of the figure wrapping over or joining the left side of the figure. The letter "N" in FIG. 4 refers to the neutral connection while U, V and W refer to the three phases. While the winding layout 100 in FIG. 5 is shown for phase U, the layouts for phases V and W are similar. Other alternative configurations may be made, for example, a "Y" configuration without a common neutral or a Delta connection, as known to those skilled in the art.

The first winding set 61 includes a combination of hairpins 24 from the first and third hairpin layers 54A,C. Referring to FIGS. 4-5, the first winding set 61 includes a first coil set 66 from the first hairpin layer 54A and a second coil set 68 from the third hairpin layer 54C. The first and second coil sets 66, 68 are connected in series through a first jumper 84. Referring to FIG. 5, the first coil set 66 may include twelve hairpins (see hairpins 70, 71, 72, 73, 74, 75, 76, 77, 78, 79, 80, 81 and 82) and the second coil set 68 may include six hairpins (hairpins 85, 86, 87, 88, 89, 90). As shown in FIG. 5, turn 82 of the first coil set 66 is connected via the first jumper 84 to turn 85 of the second coil set 68. FIGS. 4-5 show the start cable 92 and end cable 93 interconnecting the ends of the first winding set 61.

The second winding set 62 includes a combination of hairpins 24 from the second and fourth hairpin layers 54B,D. Referring to FIGS. 4-5, the second winding set 62 includes a third coil set 94 from the second hairpin layer 54B and a fourth coil set 96 from the fourth hairpin layer 54D. The third and fourth coil sets 94, 96 are connected in series through a second jumper 98. FIG. 4 shows the start cable 101 and end cable 99 interconnecting the ends of the second winding set 62.

The third winding set 63 includes a combination of hairpins 24 from the fifth and third hairpin layers 54E,C. Referring to FIGS. 4-5, the third winding set 63 includes a fifth coil set 102 from the fifth hairpin layer 54E and a sixth coil set 104 from the third hairpin layer 54C. The fifth and sixth coil sets 102, 104 are connected in series through a third jumper 106.

The fourth winding set 64 includes a combination of hairpins 24 from the sixth and fourth hairpin layers 54F,D. Referring to FIGS. 4-5, the fourth winding set 64 includes a seventh coil set 108 from the sixth hairpin layer 54F and an eighth coil set 110 from the fourth hairpin layer 54D. The seventh and eighth coil sets 108, 110 are connected in series through a fourth jumper 112. Referring to FIGS. 4-5, the first, third, fifth and seventh coil sets 66, 94, 102, 108 each include twelve hairpins and the second, fourth, sixth, and eighth coil sets 68, 96, 104, 110 each include six hairpins.

Referring to FIG. 5, the third hairpin layer 54C is shared by the first and third winding sets 61, 63. The fourth hairpin layer 54D is shared by the second and fourth winding sets 62, 64. The sharing of hairpins 24 from the third and fourth hairpin layers 54C-D may accommodate asymmetry between rotor pole or stator tooth tips (not shown). The winding layout 100 is configured such that no voltage potential exists between parallel connections.

The first, second, third, fourth, fifth and sixth hairpin layers 54A-F (shown in FIG. 2) each include a combination of short-pitched and full-pitched coils 34, 38 (shown in FIG. 3). As noted previously, the short-pitched and full-pitched coils 34, 38 are configured to extend over a first and second number of the plurality of stator slots 20, respectively, the first number being less than the second number.

In the first embodiment, the third and fourth hairpin layers 54C, 54D may include more of the short-pitched coils 34 than any of the first, second, fifth and sixth hairpin layers 54A, B, E, F. Referring to FIG. 5, the first, second, fifth and sixth hairpin layers 54A, B, E, F may each include at least two short-pitched hairpins, such as first and second short-pitched hairpins 114, 116. In the embodiment shown, the first and second short-pitched hairpins 114, 116 each span 8 slots, from slots S11 to S19 and slots S12 to S20, respectively. Referring to FIG. 5, the third and fourth hairpin layers 54C and 54D may each include at least four short-pitched hairpins, such as third, fourth, fifth and sixth short-pitched hairpins 118, 120, 122, 124. In the embodiment shown, the third through sixth short-pitched hairpins 118, 120, 122, 124 each span 8 slots, from slots S11-S19, S12-S20 and S47-S55, S48-S56 (layer 54C), and S56-S64, S57-S65, and S20-S28, S21-S29 (layer 54D), respectively.

FIG. 6 is a schematic diagram of a second embodiment of the electrical connections 160 that may be employed in the stator assembly 16 of FIG. 1. As shown in FIG. 6, the first, second, third and fourth winding sets 161, 162, 163 and 164 are parallel to one another. Each of the first, second, third and fourth winding sets 161-164 include a different plurality of hairpins 24 connected in series.

In the second embodiment, the first and second winding sets 161, 162 both may include a combination of hairpins 24 from any of the six hairpin layers 54A-F, for example it may include a combination of hairpins 24 from the first, third and fifth hairpin layers 54A, C, E or a combination from other hairpin layers. Referring to FIG. 6, the first winding set 161 includes first, second and third coil sets 166, 168, 170 (connected in series through respective jumpers 192) from the first, third and fifth hairpin layers 54A, C, E, respectively. Referring to FIG. 6, the second winding set 162 includes fourth, fifth and sixth coil sets 174, 176, 178 (connected in series through respective jumpers 192) from the first, third and fifth hairpin layers 54A, C, E, respectively. Each of the first through sixth coil sets 166, 168, 170, 174, 176, 178 may include six hairpins 24 each. In other words, the first and second winding sets 161, 162 may each include six hairpins 24 from each of the first, third and fifth hairpin layers 54A, C, E.

The third and fourth winding sets 163, 164 both may include a combination of hairpins 24 from any of the six hairpin layers 54A-F, for example it may include a combination of hairpins 24 from the second, fourth and sixth hairpin layers 54B, D, F. Referring to FIG. 6, the third winding set 163 includes seventh, eighth and ninth coil sets 180, 182, 184 (connected in series through respective jumpers 192) from the second, fourth and sixth hairpin layers 54B, D, F, respectively. Referring to FIG. 6, the fourth winding set 164 includes tenth, eleventh and twelfth coil sets 186, 188, 190 (connected in series through respective jumpers 192) from the second, fourth and sixth hairpin layers 54B, D, F, respectively. Each of the sixth through twelfth coil sets 180, 182, 184, 186, 188, 190 may include six hairpins 24 each. In other words, the third and fourth winding sets 163, 164 may each include six hairpins 24 from each of the second, fourth and sixth hairpin layers 54B, D, F.

Thus, in the second embodiment, the first, third and fifth hairpin layers 54A, C, E may be shared by the first and second winding sets 161, 162 while the second, fourth and sixth hairpin layers 54B, D, F may be shared by the third and fourth winding sets 163, 164. The windings in FIG. 6 are connected in a delta configuration but alternatively those may be connected in a Y configuration as in FIG. 4.

The configurations outlined above allow for greater flexibility in designing an electric machine 10 with a particular torque or system voltage requirement. Arbitrarily specifying a configuration for an electric machine 10 will not produce the required torque output or meet minimum noise requirements. Only specific configurations with a particular number of slots, number of phases, number of poles, number of winding sets, configuration of hairpin layers 54A-F (relative to the slot layers 22A-F) etc. will produce the desired functionality. These specific configurations cannot readily be determined by inspection. If an arrangement is not selected correctly, the design will either perform poorly or will not meet the functional requirements. Because of the large number of possible combinations, the workable configurations are neither easily determined nor obvious.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A stator assembly comprising:
a plurality of stator slots defining multiple slot layers;
a plurality of hairpins each having a respective first leg positioned in one of the multiple slot layers and a respective second leg positioned in another of the multiple slot layers, each of the plurality of hairpins being configured to allow a current to flow from the respective first leg to the respective second leg;
wherein the plurality of hairpins is divided into multiple hairpin layers, the multiple hairpin layers including first, second, third, fourth, fifth and sixth hairpin layers;
wherein the plurality of hairpins forms multiple winding sets, each of the multiple winding sets at least partially including the plurality of hairpins from at least two of the multiple hairpin layers;
wherein each of the plurality of hairpins is a short-pitched coil or a full-pitched coil, the short-pitched and full-pitched coils being configured to extend over a first and a second number of the plurality of stator slots, respectively, such that the first number is less than the second number;
wherein the first, second, third, fourth, fifth and sixth hairpin layers each include both short-pitched coils and full-pitched coils;
wherein the third and fourth hairpin layers each include more of the short-pitched coils than any of the first, second, fifth and sixth hairpin layers;
wherein only the respective plurality of hairpins in the third and fourth hairpin layers are shared by the multiple winding sets; and
wherein the respective plurality of hairpins in the first, second, fifth and sixth hairpin layers are not shared by the multiple winding sets.

2. The stator assembly of claim 1, wherein each of the multiple winding sets define an identical number of multiple phases; and the plurality of stator slots includes exactly 72 slots.

3. The stator assembly of claim 1, wherein:
the multiple winding sets include first, second, third and fourth winding sets; and
the multiple slot layers include first, second, third, fourth, fifth and sixth slot layers.

4. The stator assembly of claim 1, wherein:
the first hairpin layer is defined by the plurality of hairpins with the respective first leg in the first slot layer and the respective second leg in the second slot layer;
the second hairpin layer is defined by the plurality of hairpins with the respective first leg in the second slot layer and the respective second leg in the first slot layer;
the third hairpin layer is defined by the plurality of hairpins with the respective first leg in the third slot layer and the respective second leg in the fourth slot layer;

the fourth hairpin layer is defined by the plurality of hairpins with the respective first leg in the fourth slot layer and the respective second leg in the third slot layer;

the fifth hairpin layer is defined by the plurality of hairpins with the respective first leg in the fifth slot layer and the respective second leg in the sixth slot layer;

the sixth hairpin layer is defined by the plurality of hairpins with the respective first leg in the sixth slot layer and the respective second leg in the fifth slot layer; and the multiple winding sets include first, second, third and fourth winding sets.

5. The stator assembly of claim 4, wherein:

the first winding set includes a combination of the plurality of hairpins from the first and third hairpin layers, exclusively;

the second winding set includes a combination of the plurality of hairpins from the second and fourth hairpin layers, exclusively;

the third winding set includes a combination of the plurality of hairpins from the fifth and third hairpin layers, exclusively; and the fourth winding set includes a combination of the plurality of hairpins from the sixth and fourth hairpin layers, exclusively.

6. The stator assembly of claim 5, wherein:

the first winding set includes 12 of the plurality of hairpins from the first hairpin layer connected in series with 6 of the plurality of hairpins from the third hairpin layer;

the second winding set includes 12 of the plurality of hairpins from the second hairpin layer connected in series with 6 of the plurality of hairpins from the fourth hairpin layer;

the third winding set includes 12 of the plurality of hairpins from the fifth hairpin layer connected in series with 6 of the plurality of hairpins from the third hairpin layer; and the fourth winding set includes 12 of the plurality of hairpins from the sixth hairpin layer connected in series with 6 of the plurality of hairpins from the fourth hairpin layer.

7. The stator assembly of claim 1, wherein:

the third and fourth layers each include at least four short-pitched coils; and the first, second, fifth and sixth hairpin layers each include at least two short pitched coils.

8. An electric machine comprising:

a stator assembly;

a rotor assembly rotatable relative to the stator assembly;

wherein the stator assembly includes:
 a plurality of stator slots defining first, second, third, fourth, fifth and sixth slot layers;
 a plurality of hairpins each having a respective first leg positioned in one of the first, second, third, fourth, fifth and sixth slot layers and a respective second leg positioned in another of the first, second, third, fourth, fifth and sixth slot layers, each of the plurality of hairpins being configured to allow a current to flow from the respective first leg to the respective second leg;
 wherein each of the plurality of hairpins is a short-pitched coil or a full-pitched coil, the short-pitched and full-pitched coils being configured to extend over a first and a second number of the plurality of stator slots, respectively, such that the first number is less than the second number;
 wherein the plurality of hairpins is divided into first, second, third, fourth, fifth and sixth hairpin layers, the first, second, third, fourth, fifth and sixth hairpin layers each including both short-pitched coils and full-pitched coils;
 wherein the third and fourth hairpin layers each include more of the short-pitched coils than any of the first, second, fifth and sixth hairpin layers;
 wherein the plurality of hairpins forms first, second, third and fourth winding sets, each of the first, second, third and fourth winding sets at least partially including the plurality of hairpins from at least two of the first, second, third, fourth, fifth and sixth hairpin layers;
wherein only the respective plurality of hairpins in the third and fourth hairpin layers are shared by the multiple winding sets; and
wherein the respective plurality of hairpins in the first, second, fifth and sixth hairpin layers are not shared by the multiple winding sets.

9. The machine of claim 8, wherein:

the first hairpin layer is defined by the plurality of hairpins with the respective first leg in the first slot layer and the respective second leg in the second slot layer;

the second hairpin layer is defined by the plurality of hairpins with the respective first leg in the second slot layer and the respective second leg in the first slot layer;

the third hairpin layer is defined by the plurality of hairpins with the respective first leg in the third slot layer and the respective second leg in the fourth slot layer;

the fourth hairpin layer is defined by the plurality of hairpins with the respective first leg in the fourth slot layer and the respective second leg in the third slot layer;

the fifth hairpin layer is defined by the plurality of hairpins with the respective first leg in the fifth slot layer and the respective second leg in the sixth slot layer; and the sixth hairpin layer is defined by the plurality of hairpins with the respective first leg in the sixth slot layer and the respective second leg in the fifth slot layer.

10. The machine of claim 9, wherein the plurality of hairpins includes first through eighth coil sets, and wherein:

the first winding set includes a first coil set from the first hairpin layer and a second coil set from the third hairpin layer, exclusively;

the second winding set includes a third coil set from the second hairpin layer and a fourth coil set from the fourth hairpin layer, exclusively;

the third winding set includes a fifth coil set from the fifth hairpin layer and a sixth coil set from the third hairpin layer, exclusively; and the fourth winding set includes a seventh coil set from the sixth hairpin layer and an eighth coil set from the fourth hairpin layer, exclusively.

11. The machine of claim 10, wherein:

the first, third, fifth and seventh coil sets each include 12 of the plurality of hairpins; and the second, fourth, sixth, and eighth coil sets each include 6 of the plurality of hairpins.

* * * * *